(12) United States Patent
Wang et al.

(10) Patent No.: US 8,357,903 B2
(45) Date of Patent: Jan. 22, 2013

(54) SEGMENTED DETECTOR ARRAY

(75) Inventors: Zhengyan Wang, Antioch, IL (US); Kent Burr, Buffalo Grove, IL (US)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 10 days.

(21) Appl. No.: 12/907,092

(22) Filed: Oct. 19, 2010

(65) Prior Publication Data

US 2012/0091348 A1   Apr. 19, 2012

(51) Int. Cl.
*G01T 1/20*   (2006.01)
(52) U.S. Cl. .................................................. 250/362
(58) Field of Classification Search .................. 250/362
See application file for complete search history.

(56) References Cited

U.S. PATENT DOCUMENTS

| | | | |
|---|---|---|---|
| 4,945,241 A * | 7/1990 | Yamashita et al. | 250/367 |
| 5,032,728 A * | 7/1991 | Chang et al. | 250/363.04 |
| 5,091,650 A * | 2/1992 | Uchida et al. | 250/366 |
| 5,329,124 A * | 7/1994 | Yamamoto et al. | 250/367 |
| 5,442,179 A * | 8/1995 | Ohishi | 250/363.02 |
| 2004/0021082 A1* | 2/2004 | Wong et al. | 250/367 |
| 2004/0178347 A1* | 9/2004 | Murayama et al. | 250/367 |
| 2004/0262526 A1* | 12/2004 | Corbeil et al. | 250/367 |
| 2005/0072904 A1* | 4/2005 | Aykac et al. | 250/208.1 |
| 2005/0087693 A1* | 4/2005 | Sumiya et al. | 250/367 |
| 2005/0104000 A1* | 5/2005 | Kindem et al. | 250/361 R |
| 2010/0012846 A1* | 1/2010 | Wang | 250/362 |
| 2010/0155610 A1* | 6/2010 | Menge et al. | 250/368 |

FOREIGN PATENT DOCUMENTS

JP   2007-41007   2/2007

* cited by examiner

*Primary Examiner* — Marcus Taningco
(74) *Attorney, Agent, or Firm* — Oblon, Spivak, McClelland, Maier & Neustadt, L.L.P.

(57) ABSTRACT

A radiation detector that includes multiple adjacent modular detector segments. Each segment includes an array of scintillation crystal elements, a light guide arranged adjacent to the array of scintillation crystal elements, and reflectors arranged around a periphery of the segment so that light produced by a scintillation event in the segment is substantially confined to the segment. In one embodiment, each segment is coupled to multiple photosensors, each photosensor receiving light from at least one of the segments.

19 Claims, 14 Drawing Sheets

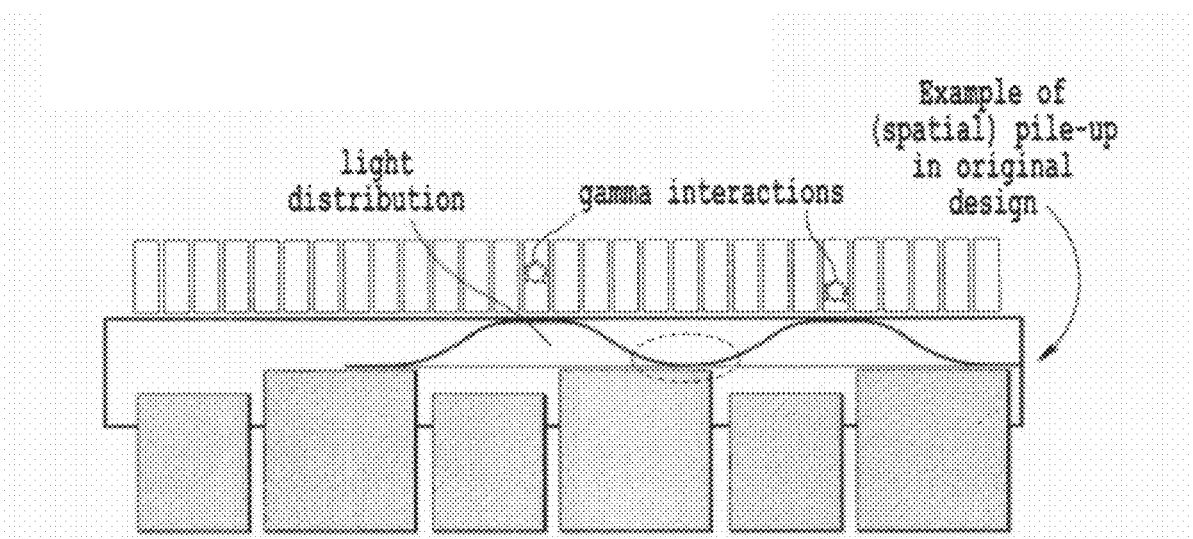
Fig. 4A ORIGINAL DESIGN (NON-SEGMENTED), SIDE VIEW
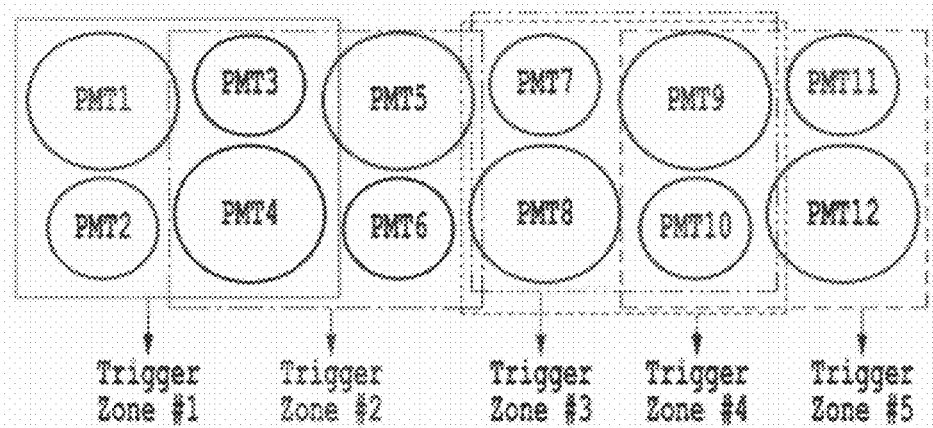
Fig. 4B TRIGGER ZONES (OVERLAPPING), TOP VIEW
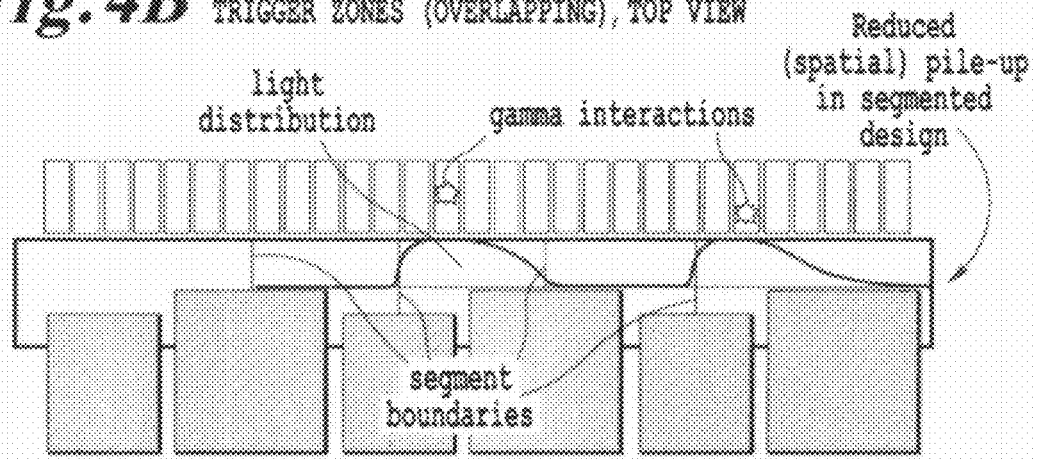
Fig. 4C SEGMENTED DESIGN, SIDE VIEW

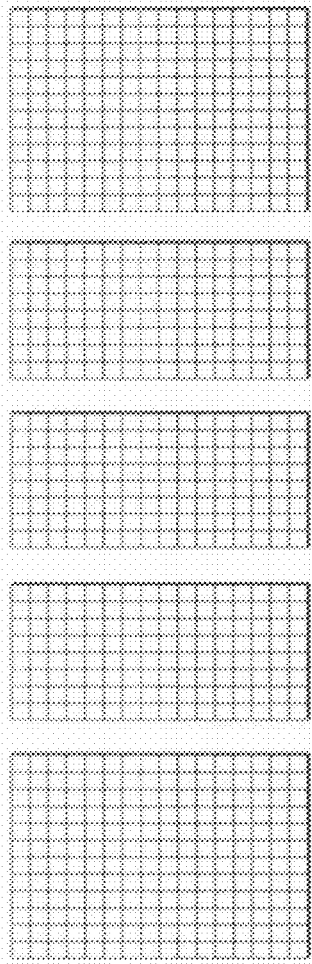
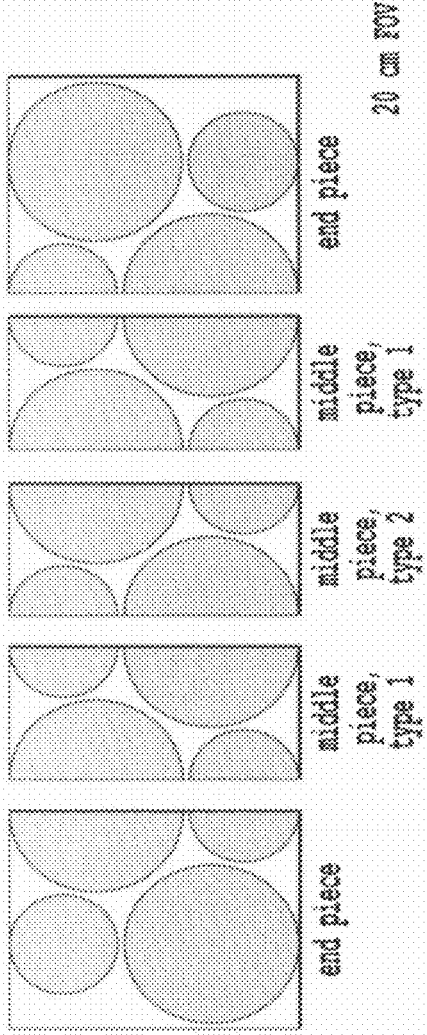
Fig. 5A
SEGMENTED DETECTOR CONCEPT
SCINTILLATOR ARRAY – Composed of two types of sub-arrays: end type and middle type
Fig. 5B
LIGHT GUIDE – Composed of three types of sub-pieces: end type, middle type 1 and middle type 2
Note: middle piece type 1 and type 2 are not identical; they are mirror images of each other

SEGMENTED DETECTOR ARRAY

FIELD

Embodiments described herein relate generally to the design of radiation detectors, such as for gamma ray detection and positron emission tomography.

BACKGROUND

The use of gamma ray detectors in general, and positron emission tomography (PET) in particular, is growing in the field of medical imaging. In PET imaging, a radiopharmaceutical agent is introduced into an object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays (at 511 keV) traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller or larger dimensions and non-square sections are also possible. The length or depth of the crystal will determine how likely the gamma ray will be captured, and typically ranges from 10 to 30 mm. The detector module is the main building block of the scanner.

PET imaging relies on the conversion of gamma rays into light through fast and bright scintillation crystals. After determining the interaction position in the scintillator and time pairing of individual events, the location of the annihilation process can be recreated. These actions require very fast components—detector and electronics—and they also require excellent signal to noise ratio. With high quality electronics, the signal to noise ratio is mainly determined by the inherent Poisson statistics involved in the detection process. Detecting more photons will result in improved signal-to-noise-ratio, and, therefore, better spatial and timing resolution. No improvement in detector design and electronics can compensate for significant loss of light in the detection process. The fraction of the total amount of light collected (relative to the amount created in the scintillator) is a good measure of the efficiency of the design. So to maximize the amount of light collected, one would try to get the light sensor as close as possible to the scintillation crystal and avoid reflections and other edge effects. This would then force the arrangement to be large array detector with short distance between crystal and sensor.

As described above, a PET imaging system is more than just a counter and, in addition to detecting the presence of a scintillation event, the system must identify its location. Conceptually, perhaps the most straightforward design to allow identification of the location of each interaction is to have a separate photosensor and data acquisition channel for each scintillator crystal. Due to constraints such as the physical size of common photosensors, the power required for each data acquisition channel, and the associated cost of these items, some form of multiplexing is usually used to reduce the number of photosensors and channels of electronics.

By properly documenting how light is being distributed to the multiple light sensors, it is possible to assign an event location for any given set of sensor responses. Light therefore needs to be distributed to multiple sensors. In order to accomplish an adequate light distribution (so that enough sensors would detect a fraction of the light) it may be necessary to increase the thickness of the light guide or space between the crystals and the sensor. However, fast counting requires that multiple events be processed simultaneously, favoring optical isolation between scintillation events, and the creation of smaller detector blocks. These two requirements are pushing the detector design in two different directions.

Currently available PET scanners have two main detector module designs. The first type is a large area detector in which an array of crystals that covers the entire axial extent of the cylinder is formed. Several modules are then arranged together to form a cylinder, each module being optically coupled to the next. An array of photosensors (e.g., photomultiplier tubes or PMTs) is placed on the modules and on the interfaces between modules. See the design shown in FIG. 1A, which illustrates a module that includes an array of crystal elements and an array of PMTs. This approach minimizes the number of optical interfaces and boundaries, and ensures excellent light collection. However, this design suffers from larger numbers of sensors being exposed to the light of a single scintillation event, potentially limiting the ability to process events occurring close to each other, as well as limiting the overall counting capacity.

The second design is based upon an optically isolated block having, for example, four PMT sensors, so as to allow for simplified crystal identification. In the design of FIG. 1A, a block element is composed of four photomultiplier tube sensors on an approximately 50 mm×50 mm crystal assembly. In this approach, the crystals extend to the very edge of the array and a relatively thick light guide is therefore often used to capture enough light from all PMTs to be able to detect the position of the event. A detector is then formed by arranging multiple blocks (e.g., three or four) to fill out the axial extent, and then repeating this pattern to create the overall cylinder. See the designs shown in FIGS. 1B and 1C. The advantages of this approach include greater flexibility (the detector block is potentially fully functional outside of the scanner (meaning that the detector block can be tested and calibrated separately, as opposed to the large area, continuous detector that can only be tested and calibration as part of a complete system—offering advantages for service at the customer site and for manufacturing of the scanner)) and better count capacity due to the potential parallel operation of each module. The disadvantages of this design are the inclusion of a large number of optical surfaces, potentially interfering with efficient light collection, and a more limited set of options for sensor coverage.

As shown in FIG. 8, in one design of the conventional art, an array of overlapping PMTs is arranged over small 2D crystal arrays. In this case, four quadrants from four sensors cover each crystal array. However, for this design, there is no means to manage the edges and the concept seems to be better adapted to covering large surfaces. Further, modern PET systems with ToF capabilities use mostly 1 and 1½ inch PMTs, which implies a large number of very small arrays. In addition, this design has no equivalent implementation in a long and narrow detector. The 1D version shown in the top of FIG. 8, with one sensor sharing half of its surface with two adjacent sub-arrays simply does not carry enough information to perform 2D positioning.

Quadrant sharing can be implemented in two ways.

In the independent module quadrant sharing approach, adjacent independent modules, such as the module shown in FIG. 10A, are not optically coupled and do not share any PMTs. As shown in FIG. 10B, scintillator arrays of independent quadrant sharing modules cannot be placed closer than approximately the width of one photosensor (PMT). The large gaps between adjacent modules in the independent quadrant sharing approach are a major disadvantage of that approach. Moreover, the independent module quadrant sharing approach on a long and narrow array would be terribly inefficient and would clearly prevent close packing.

In the continuous quadrant sharing approach, as shown in FIG. 10C, the detector is essentially continuous around the entire circumference of the ring. In this approach, scintillator arrays of quadrant sharing modules can be placed closer if they share PMTs, thereby losing their independence. In this case, the modules essentially become a single continuous detector in which some PMTs are shared between modules. The loss of independence of the modules in the continuous quadrant sharing approach means that the detector is only fully functional once every detector module has been installed, and modules cannot be fully tested and calibrated before installation. The continuous quadrant sharing approach does not allow for the production and testing of fully functional independent units prior to inclusion of the units in the scanner, and also does not allow for replacement of an independent module when part of the detector fails. This is a significant practical disadvantage for the continuous quadrant sharing approach.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates trigger zones and a comparison of the light distribution for two events in segmented and non-segmented embodiments;

FIG. 5 illustrates crystal sub-arrays and corresponding light guide pieces in a 20 cm FOV embodiment;

DETAILED DESCRIPTION

Figure 1A:
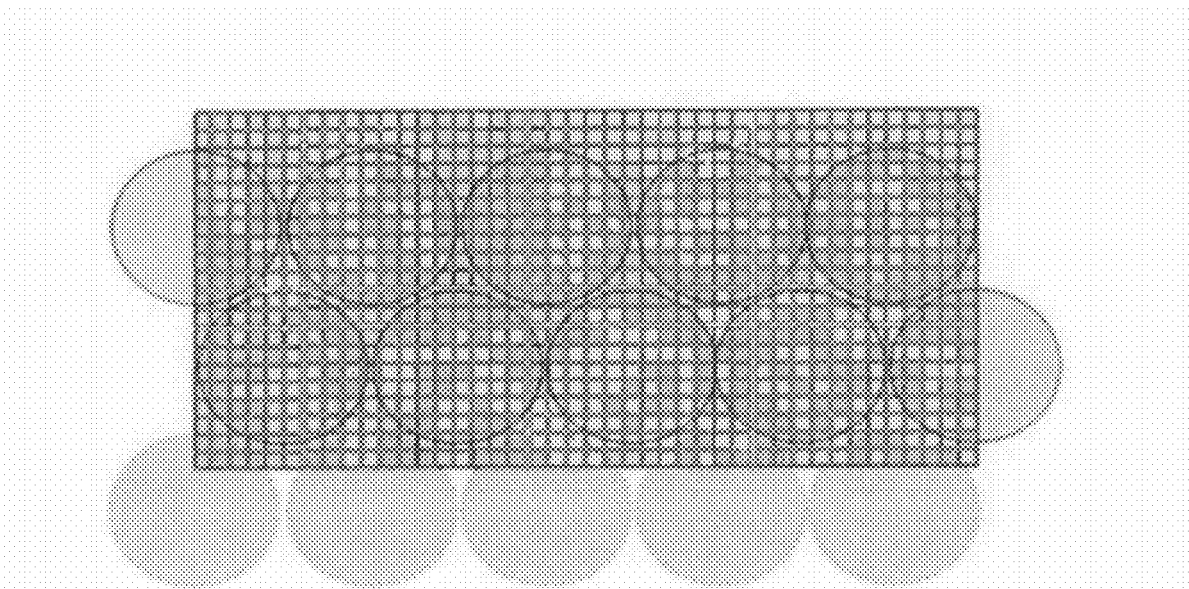
FIGS. 1A, 1B, and 1C illustrate conventional PET detector module designs in which photosensors are arranged to cover scintillation arrays.
Figure 1B:
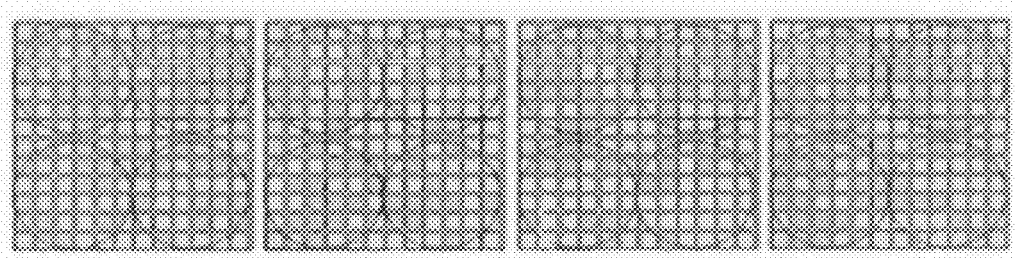
Figure 1C:
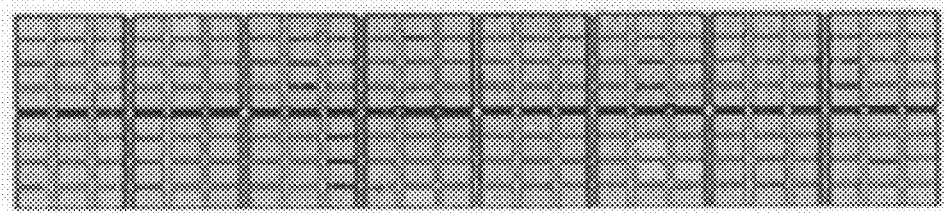

In one embodiment, a radiation detector includes multiple adjacent modular detector segments. Each segment includes an array of scintillation crystal elements, a light guide arranged adjacent to the array of scintillation crystal elements, and reflectors arranged around a periphery of the segment so that light produced by a scintillation event in the segment is substantially confined to the segment. In this embodiment, each segment is coupled to multiple photosensors, each photosensor being configured to receive light from two of the segments.

In another embodiment, a positron emission tomography detector module includes an array of scintillation crystal elements, the array including a plurality of substantially optically isolated sub-arrays, and a plurality of photosensors arranged to cover the array of crystal elements and configured to receive light emitted from the array of crystal elements. In this embodiment, the sub-arrays are optically isolated so that light emitted from an individual scintillation crystal located in a corresponding sub-array is concentrated so as to be primarily received only by those photosensors of the plurality of photosensors that cover the corresponding sub-array. Further, in this embodiment, at least one photosensor of the plurality of photosensors, which receives light emitted from crystals in a first sub-array, also receives light emitted from crystals in one and only one sub-array that is adjacent to the first sub-array.

In another embodiment, a positron emission tomography scanner system includes a plurality of detector modules arranged adjacent to one another to form a cylindrical detector ring. Further, each of the detector modules includes a plurality of adjacent modular detector segments. In addition, in this embodiment, each segment includes an array of scintillation crystal elements, a light guide arranged adjacent to the array of scintillation crystal elements, and reflectors arranged around a periphery of the segment so that light produced by a scintillation event in the segment is substantially confined to the segment. Further, each segment is coupled to a plurality of photosensors, each photosensor being configured to receive light from at least one of the segments.

In another embodiment, a method of manufacturing a radiation detector module includes the steps of manufacturing a plurality of scintillation crystal sub-arrays, including two end sub-arrays and a plurality of middle sub-arrays; manufacturing a plurality of light guide pieces, including two end pieces and a plurality of middle pieces; attaching each end sub array to a corresponding one of the end pieces to form two end segments; attaching each middle sub-array to a corresponding one of the middle pieces to form a plurality of middle segments; attaching reflective material to a side surface of at least one of the middle segments; and attaching the end segments and the plurality of middle segments together to form a module base having a scintillation layer and a light guide layer.

Figure 1D:
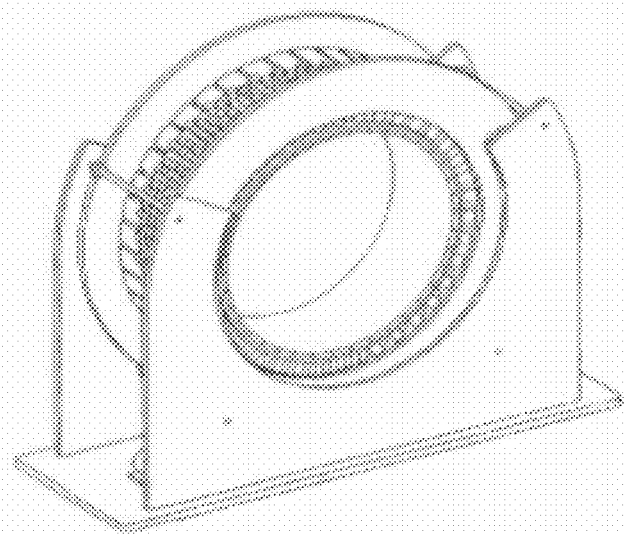
FIG. 1D illustrates a PET scanner ring having a plurality of detector modules.

Referring now to the drawings, FIG. 1D illustrates a PET scanner design according to one embodiment. As shown in FIG. 1D, a detector ring includes a number of rectangular detector modules. According to one embodiment, the detector ring includes 40 detector modules. In another embodiment, 48 modules are used to create a larger bore size for the scanner.

Figure 2:
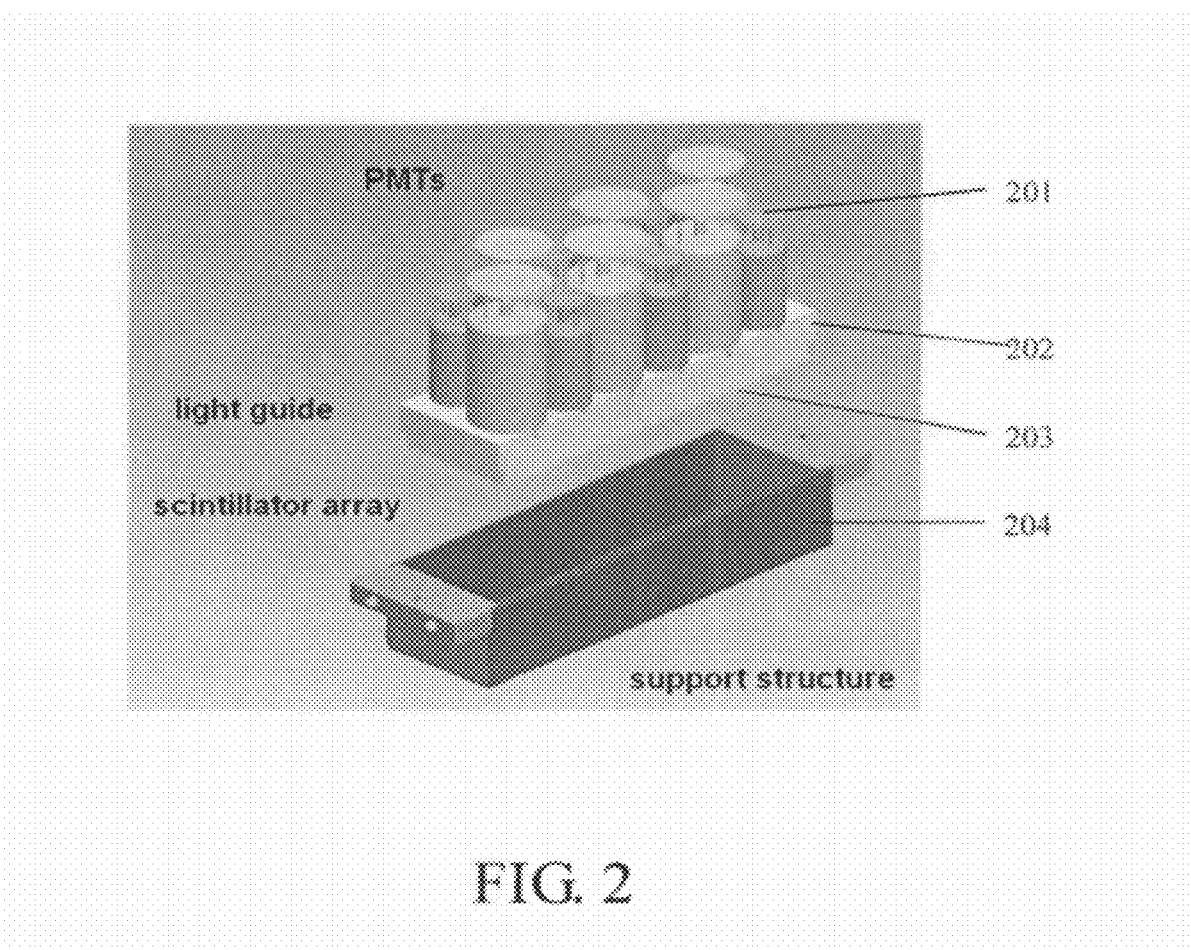
FIG. 2 illustrates one embodiment of a detector module, which includes a support structure, a scintillator array, a light guide, and an arrangement of PMTs.

FIG. 2 illustrates a detector module design that includes a support structure 204 and a two-dimensional array of individual detector crystals 203, which absorb the gamma radiation and emit scintillation photons, which are detected by the photomultiplier tubes. A light guide 202 is disposed between the array of detector crystals and the photomultiplier tubes (PMTs) 201. As shown in FIG. 2, each detector module includes a number of PMTs of various sizes, each of which covers a plurality of detector crystals. Each PMT produces an analog signal which rises sharply when a scintillation event occurs, and then tails off exponentially. The photons emitted from one detector crystal can be detected by more than one PMT. However, based on the analog signal produced at each PMT, the detector crystal corresponding to an event can be determined.

The detector module shown in FIG. 2 is narrow and long. Typically, the long axis is more than 3-4 times longer than the short axis. This design minimizes the ratio of crystals on the edge of the modules to crystals in the interior of the module and still produces a large enough multiplicity of independent modules to ensure an adequate counting capacity. Since each module is optically isolated and photosensors are not shared between adjacent modules, each module can be calibrated independently.

The detector module arrangement of FIG. 2 provides a compromise between creating as many optically independent modules as possible to maximize count rate and creating a large continuous detection surface to maximize light collection and minimize edge effects.

The configuration of FIG. 2 still contains a fair amount of light sharing and light contamination along the long axis of the detector. Additionally, construction of the large structure shown in FIG. 2, with detailed optics requirement, may present some manufacturing challenges.

Figure 3:
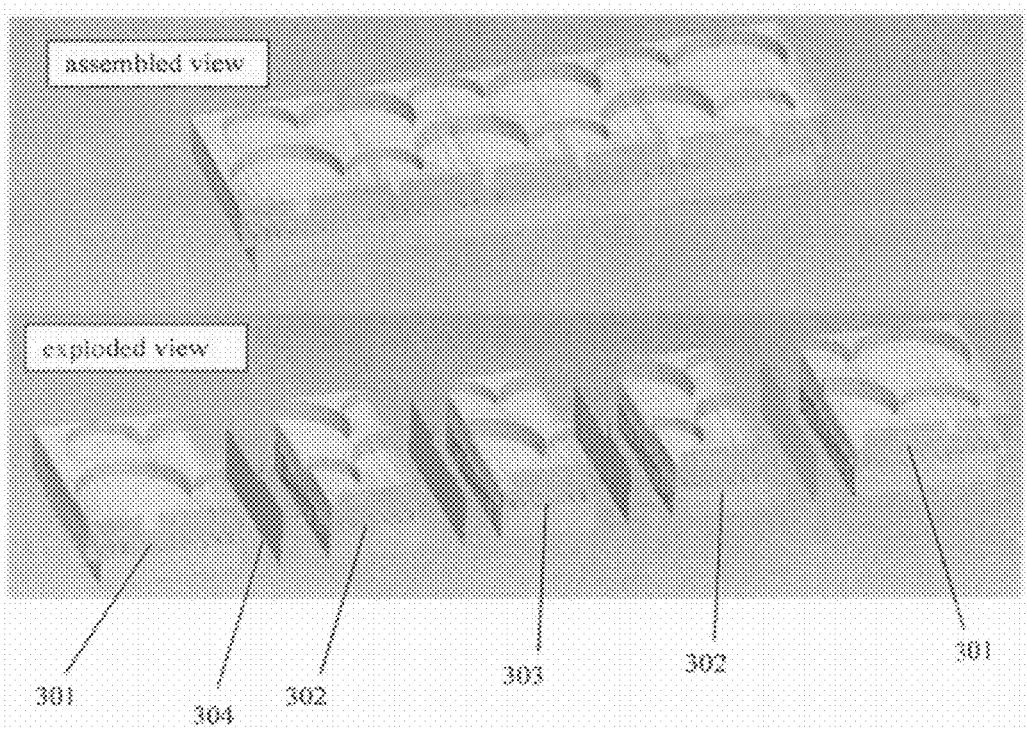
FIG. 3 illustrates a radiation detector including a plurality of adjacent modular detector segments, each segment including a crystal array and a light guide.

One embodiment described herein is directed to a method of manufacturing the long and narrow detector module shown in FIG. 2 using modular segments. As shown in FIG. 3, by segmenting the crystal array and light guide, better performance and easier manufacturability can be achieved. In one embodiment, the crystal array and light guide are segmented over the center line joining two PMTs. In the embodiment shown in FIG. 3, three types of segments are used, each segment including a crystal sub-array and a corresponding light guide sub-piece. One type of segment in this embodiment is an end-type segment 301, described in more detail below with respect to FIGS. 5 and 6.

Figure 6A:
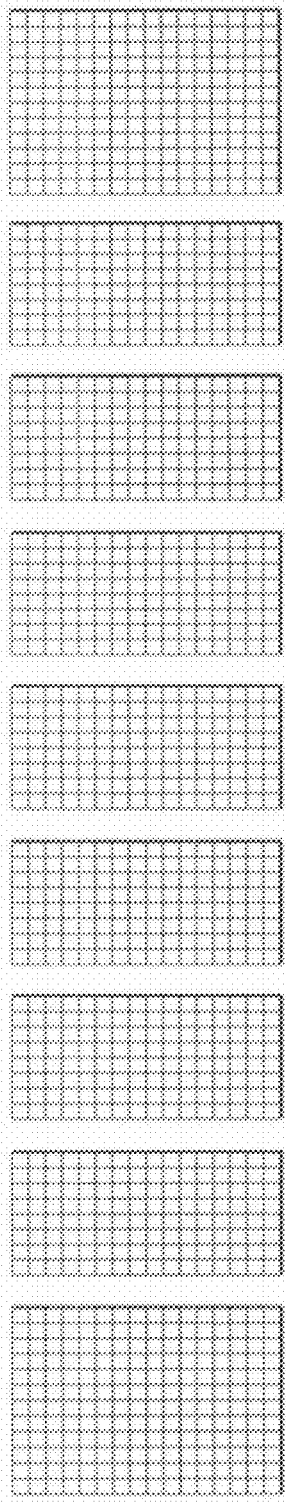
FIG. 6 illustrates crystal sub-arrays and corresponding light guide pieces in a 32 cm FOV embodiment.
Figure 6B:
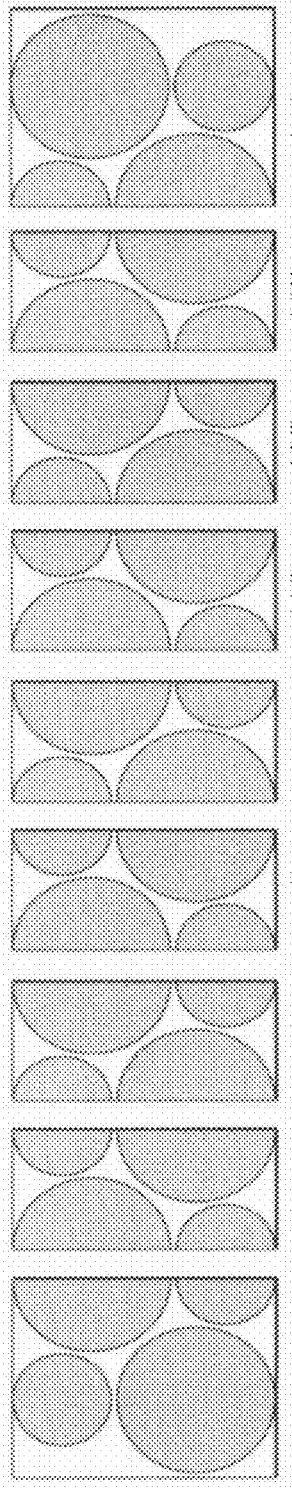

The other types of segments in this embodiment are middle-type segments 302 and 303, which are also shown in FIGS. 5 and 6.

Further, in this embodiment, each sub-array is optically isolated, for example, by attaching reflective material around each crystal sub-array shown in FIG. 3. Several advantages result from this. First, light from one sub-array will stay on the same array and will decrease the overlap or contamination of adjacent sub-arrays, as discussed below with respect to FIG. 4. Second, each scintillation event will always affect only four PMTs. In this embodiment, the signals from all PMTs in a group of four are connected to form a trigger zone (i.e., the PMTs that are summed in the analog domain to generate the timing trigger signal). For example, FIG. 4 shows five trigger zones, with PMTs 1-4 forming a first trigger zone, PMTs 3-6 forming a second trigger zone, etc.

Having small trigger zones, as in this embodiment, is an advantage with respect to timing resolution. For example, the pre-amplifier on each PMT channel adds some noise to the signal, so reducing the total number of channels in the trigger zone reduces the total noise. Light that spreads beyond the four-PMT region does not contribute to the timing signal. In this embodiment, essentially all of the scintillation light from a gamma event is confined to a single trigger zone. The increased signal-to-noise ratio results in improved timing resolution. Since the boundaries of the over-lapping trigger zones align with the center of the light sensors, the boundaries (seams) of the segments must also align with the center of the light sensors to fully realize this benefit.

Moreover, two events can be processed at the same time provided that the events do not share any PMTs, which is accomplished as soon as there are one or more sub-arrays between the two events under consideration. The events are processed using a combination of analog and digital electronics to produce an estimate of the arrival time, the energy, and the interaction position for each gamma ray. In most conventional gamma ray detection systems, the timing is derived by generating a composite timing signal by analog summation of signals from a number of PMTs. Next, a leading-edge or constant-fraction discriminator is applied to the composite signal.

The PMTs whose signals are summed are often referred to as a "trigger zone," which may overlap or which may be kept separate. In one embodiment, the trigger zones overlap. In addition to being used to derive the arrival time of an event, the summed signal for each trigger zone usually initiates the acquisition or processing of energy and position information.

Generally, each PMT is connected to an independent channel of electronics which typically includes a shaping filter and an analog-to-digital converter. When the acquisition is triggered, the PMT signals for each PMT in the trigger zone are integrated over a pre-determined time window. The integrated PMT signals are then digitally summed to produce an estimate of the energy of the event, and a centroid calculation using these signals is used to estimate the interaction position. Modern systems include multiple corrections, often based on stored look-up tables, to further improve the timing, energy, and position estimate.

Further, as illustrated in the bottom of FIG. 4, the light from one scintillation event will be channeled to fewer sensors, increasing the statistical quality of the detection, which results in better timing information. In the non-segmented design shown in the top of FIG. 4, the light distribution from two events can overlap (mutual interference or pile-up), especially at high count rates, which decreases the quality of the detection.

Additionally, the segmented approach of FIG. 3 provides easier and more cost-effective manufacturability. Since the crystal is by far the most expensive component of the scanner, production yield on crystal arrays should be higher since a faulty or otherwise under-performing array could be rejected with a smaller impact on cost, since the faulty array affects is only a small sub-array.

Further, the crystal sub-arrays and the light guide pieces for the different segments can be optically coupled (e.g., glued together) and inspected independently. Thus, a problem with one segment can be fixed without remanufacturing the entire detector module. In addition, small crystal sub-arrays are easier to manufacture and handle, which should lead to a cost reduction.

Further, variable sized detector modules can be created and easily maintained with the same set of sub-arrays. For instance, a 20 cm long detector can be manufactured using two types of crystal sub-arrays (two 12×16 end arrays and three 8×16 middle arrays) and three types of light guide sub-pieces (an end piece and two types of middle pieces), as shown in FIG. 5. In addition, as shown in FIG. 6, a 32 cm detector module can be manufactured using the same sub-arrays (two 12×16 end arrays and seven 8×16 middle arrays) and the same light guide sub-pieces. In particular, the 32 cm detector module uses four middle pieces of the first type and three middle pieces of the second type, in addition to the two end pieces. Other sizes of crystal sub-arrays and other combinations or sizes of light guide pieces are possible.

Again, because the crystal is an expensive component, manufacturing processes using shared components between different types of scanners and building the required proportion of each type according to live market conditions should be much more efficient.

Figure 9:
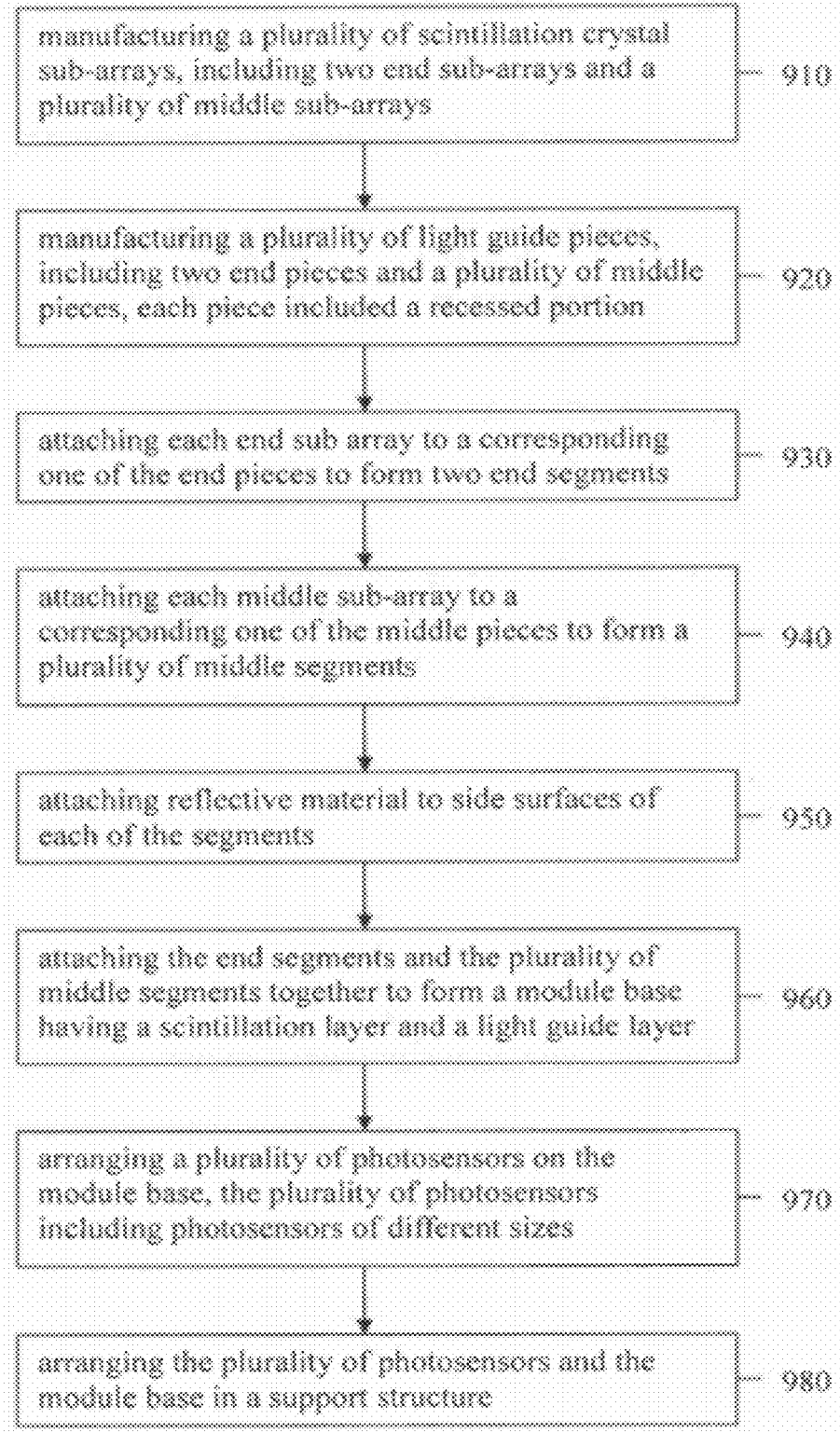
FIG. 9 illustrates the steps in a method of manufacturing a radiation detector module according to one embodiment.
Figure 10A:
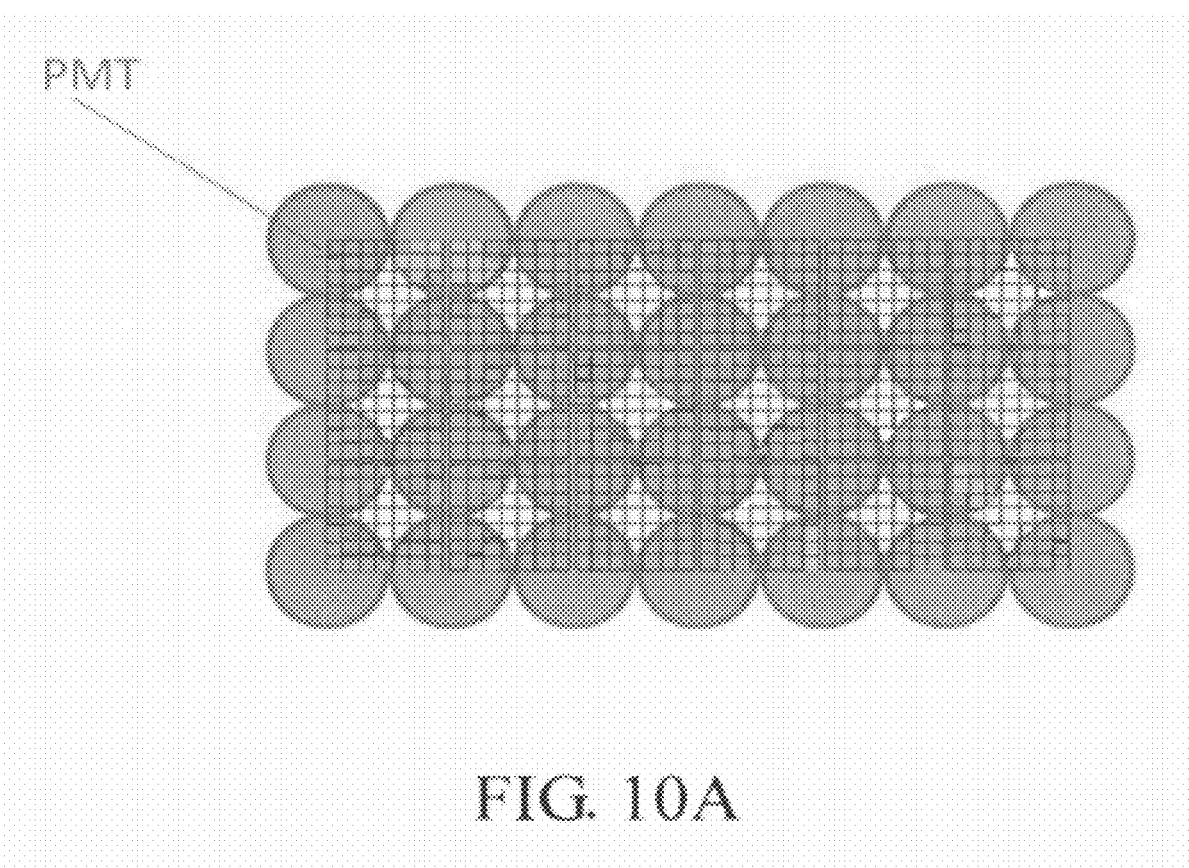
FIGS. 10A-10C illustrate conventional quadrant sharing designs.
Figure 10B:
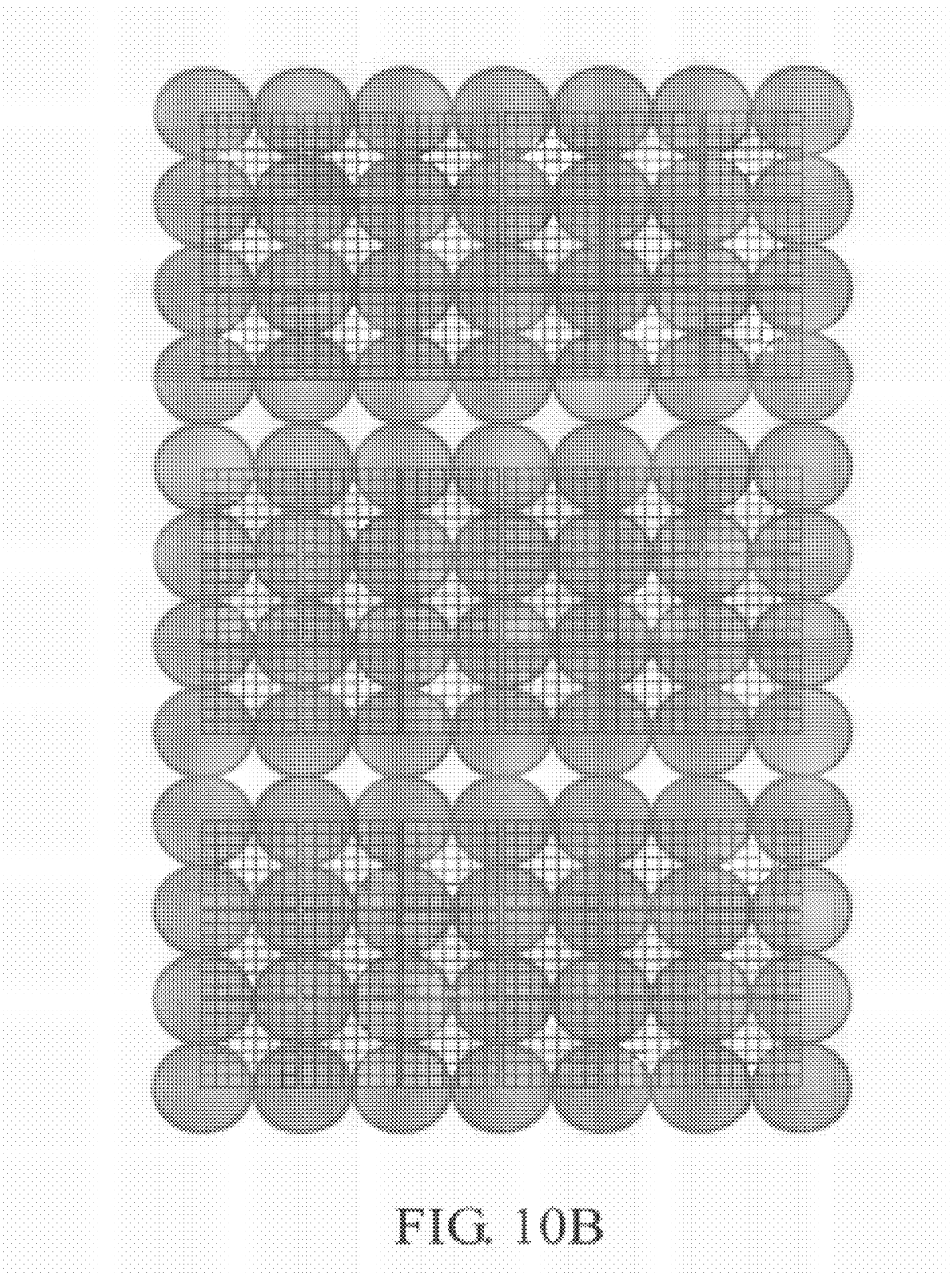
Figure 10C:
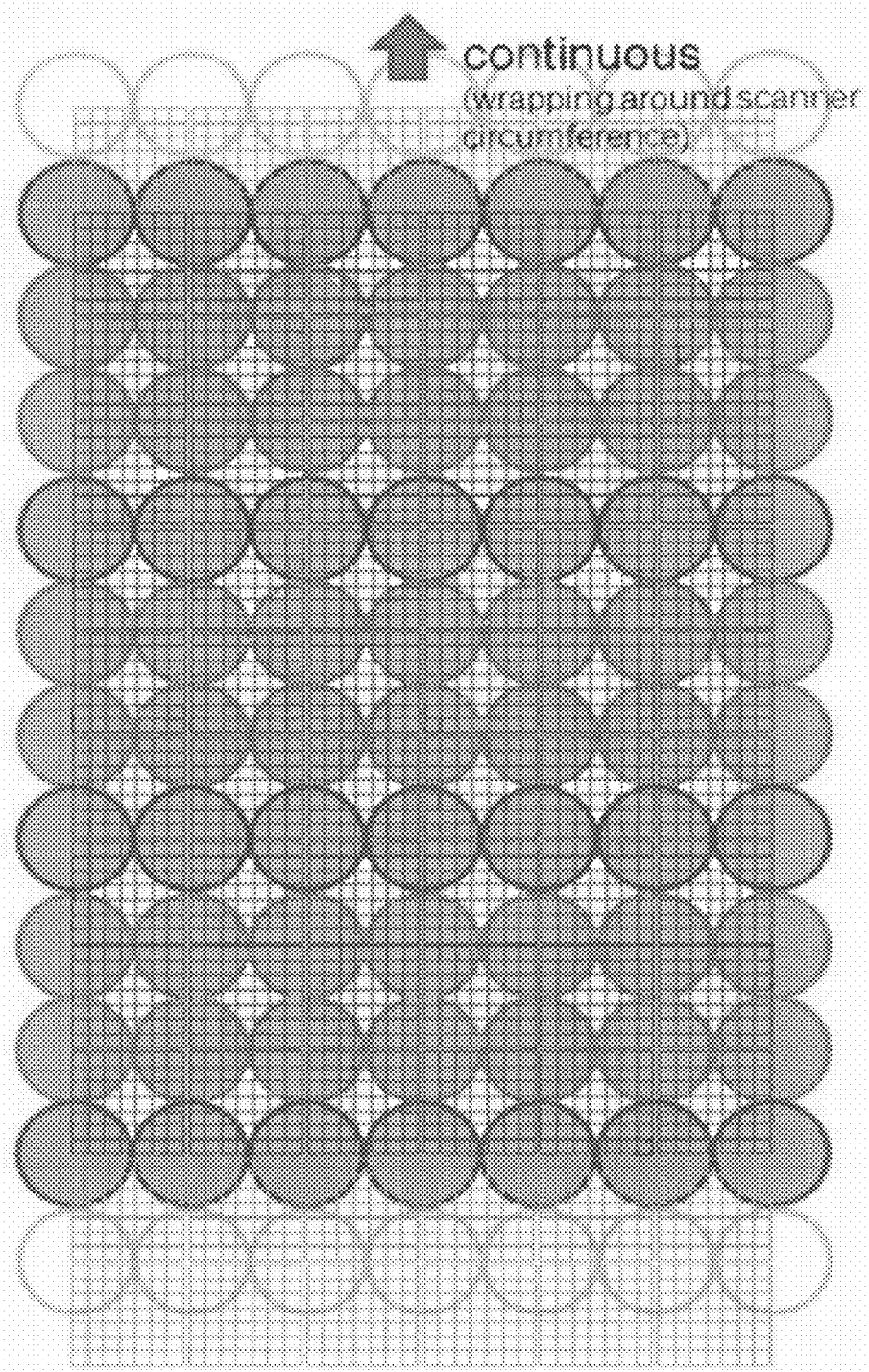

FIG. 9 illustrates the steps in a method of manufacturing a radiation detector module according to one embodiment.

In step 910, a plurality of scintillation crystal sub-arrays, including two end sub-arrays and a plurality of middle sub-arrays is manufactured. See FIGS. 5 and 6, for example.

In step 920, a plurality of light guide pieces, including two end pieces and a plurality of middle pieces are manufactured. See FIG. 3, which illustrates that each light guide piece includes at least one recessed portion for holding portions of one or more PMTs.

In step 930, each end sub array is attached to a corresponding one of the end light guide pieces to form two end segments.

In step 940, each middle sub-array is attached to a corresponding one of the middle pieces to form a plurality of middle segments. See FIGS. 3, 5, and 6.

In step 950, reflective material is attached to side surfaces of each of the end and middle segments.

In step 960, the end segments and the plurality of middle segments are attached together, for example in the order shown in one of FIGS. 5 and 6, to form a module base having a scintillation layer and a light guide layer.

In step 970, a plurality of photosensors is arranged on the module base using the recessed portions to hold the photosensors in place, wherein the plurality of photosensors can include photosensors of different sizes.

In step 980, the plurality of photosensors and the module base is arranged in the support structure 204 shown in FIG. 2.

Figure 7:
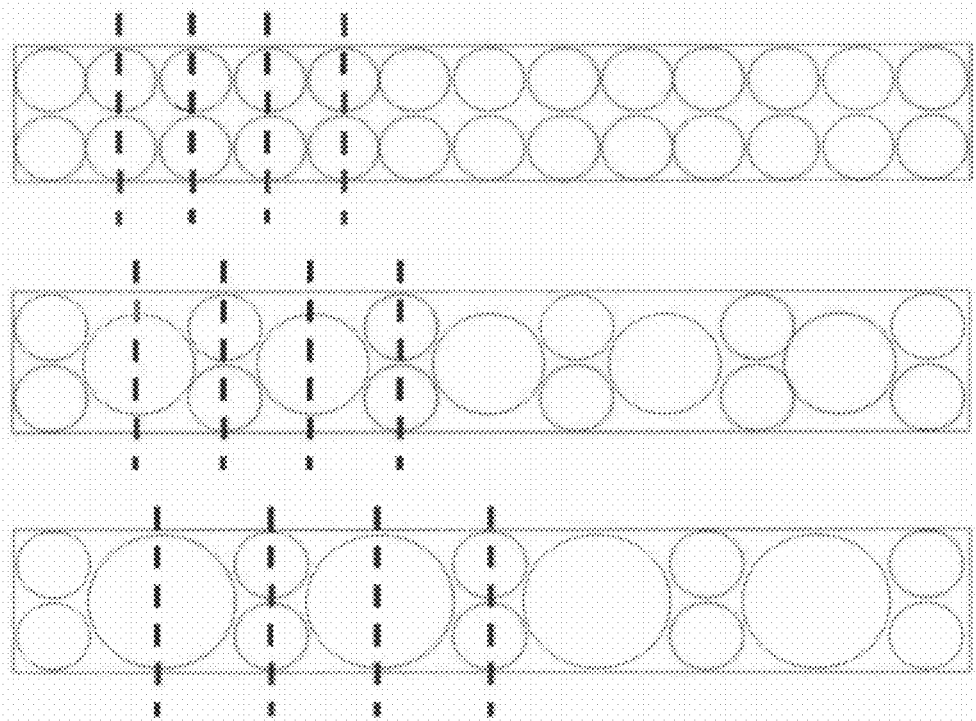
FIG. 7 illustrates segmented detector modules according to alternative embodiments.
Figure 8:
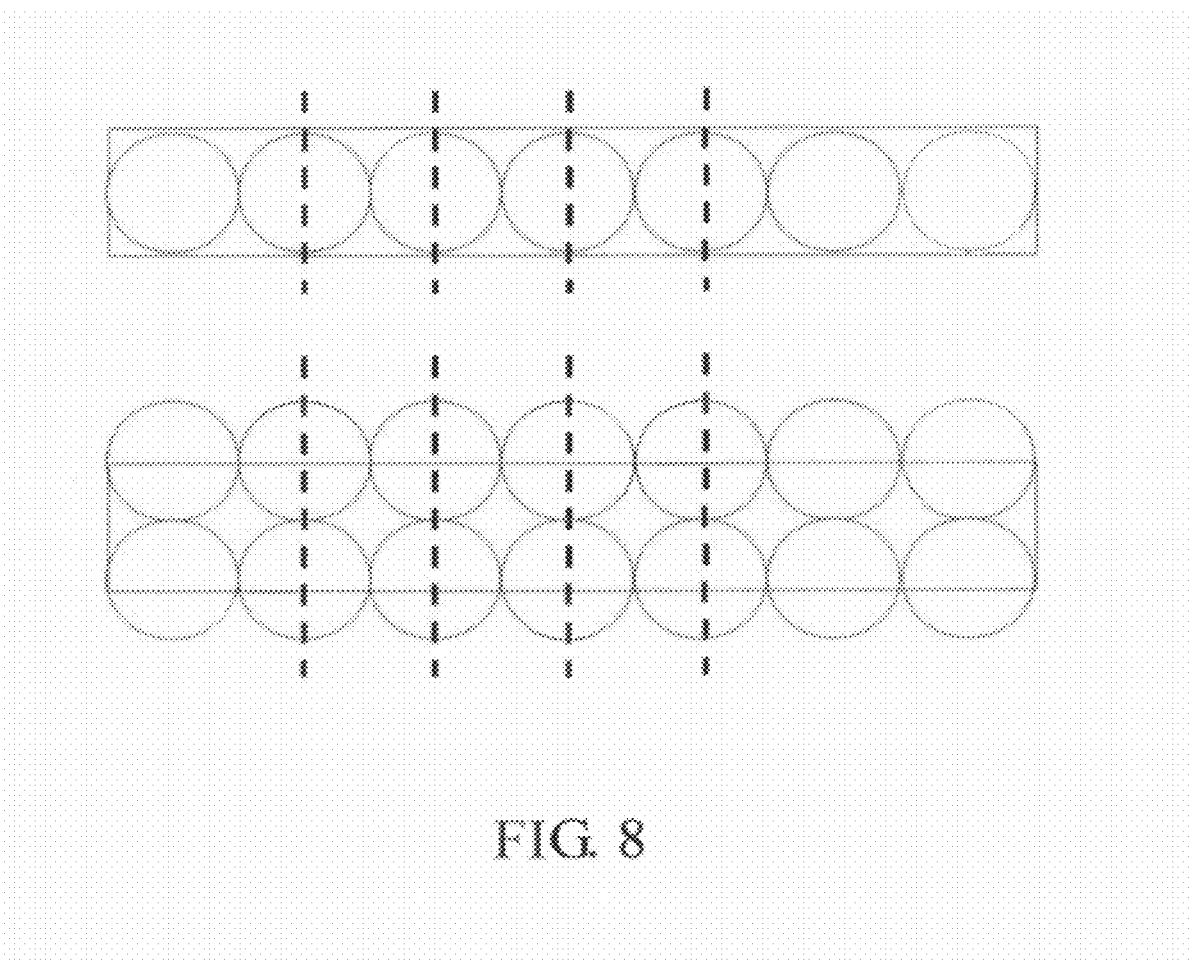
FIG. 8 illustrates conventional detector modules.

In alternative embodiments, the concepts discussed above can be applied to other configurations using the rule that each sub-array needs to be connected to the smallest number of sensors necessary to perform the positioning calculation. For example, as shown in FIG. 7, the minimum number of sensors required is four for the top configuration, while the minimum number of sensors required is three for the lower two designs shown in FIG. 7. We note that the dotted lines shown in FIG. 7 indicate how the module is segmented, but that not all of the segments are shown.

Figure 11A:
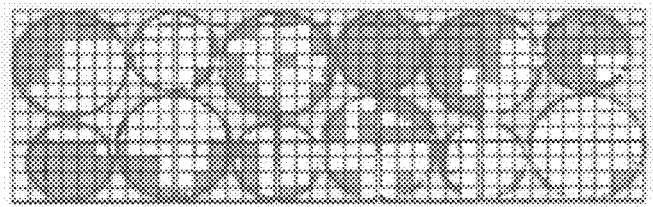
FIGS. 11A and 11B illustrate an independent-module, continuous quadrant-sharing embodiment.
Figure 11B:
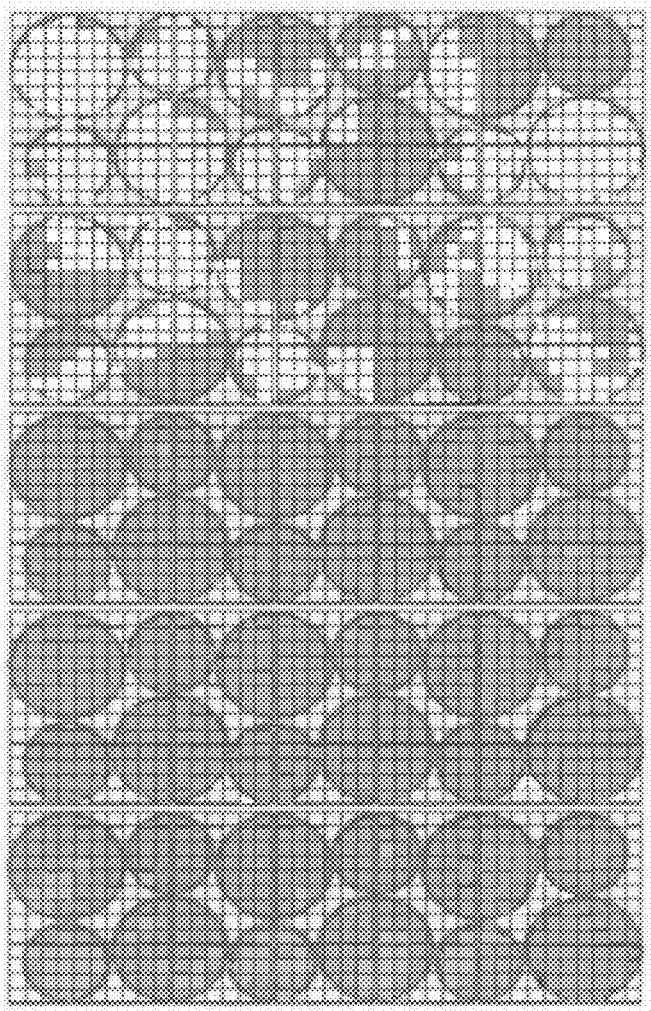

FIGS. 11A and 11B illustrate a segmented design allowing for a plurality of independent modules (as shown for example in FIG. 11A) to be placed close together with minimal gaps there between, while retaining their independence, as shown in FIG. 11B. In particular, the gap between modules in FIG. 11B is significantly smaller than the width of a photosensor, and comparable to a single crystal width or smaller, e.g., less than four mm.

This arrangement is possible because at least one photosensor (of the plurality of photosensors in the module), which receives light emitted from crystals in a first sub-array, also receives light emitted from crystals in one and only one sub-array that is adjacent to the first sub-array. Unlike the conventional quadrant sharing approach, in which a single photosensor is shared between more than two sub-arrays (i.e., the photosensors are shared between sub-arrays spanning two orthogonal directions), in the present embodiment, the photosensors are only shared in one direction and between at most two sub-arrays.

The arrangement shown in FIG. 11B is a practical advantage of the segmented module approach because each module can be fully tested and calibrated before installation in the scanner. Also, when a module has to be replaced, the replacement is faster because the replacement module does not have to be optically coupled to the neighboring modules and the module can be pre-calibrated prior to installation.

In one embodiment, the sensor array is substantially the same size as the crystal array, which imposes restrictions on the size of the assembly. In one embodiment, the crystal array has to be substantially the size of the sensor diameter, or a little smaller to account for manufacturing and assembly tolerances.

As discussed above, embodiments disclosed herein offers a cost reduction, an increase in the total amount of light available for detection, and better performance at high count rates than continuous detectors.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A positron emission tomography (PET) detector module, comprising:
    an array of scintillation crystal elements, the array including a plurality of substantially optically isolated sub-arrays; and
    a plurality of photosensors arranged to cover the array of crystal elements and configured to receive light emitted from the array of crystal elements, wherein each photosensor of the plurality of photosensors is arranged to cover a portion of at most two of the sub-arrays,
    wherein the sub-arrays are optically isolated so that light emitted from an individual scintillation crystal located in a corresponding sub-array is concentrated so as to be primarily received only by those photosensors of the plurality of photosensors that cover the corresponding sub-array; and
    at least one photosensor of the plurality of photosensors, which receives light emitted from crystals in a first sub-array, also receives light emitted from crystals in one and only one sub-array that is adjacent to the first sub-array.

2. The PET detector module of claim 1, wherein
    each sub-array is covered by respective portions of a corresponding group of four photosensors of the plurality of photosensors;
    light from any individual scintillation crystal located in a corresponding sub-array is concentrated so as to be primarily received only by the respective portions of the corresponding group of four photosensors; and
    at least two photosensors of the plurality of photosensors, which receives light emitted from crystals in the first sub-array, also receives light emitted from crystals in one and only one sub-array that is adjacent to the first sub-array.

3. The PET detector module of claim 1, further comprising:
    a signal processing device configured to aggregate, for each scintillation event, output signals from each photosensor in a trigger zone of a plurality of overlapping trigger zones defined for the module, each trigger zone including a plurality of photosensors of the plurality of photosensors, wherein at least one photosensor, which receives light from adjacent sub-arrays, belongs to two trigger zones.

4. The PET detector module of claim 1, further comprising:
    reflector elements configured to substantially concentrate the light emitted from the individual scintillation crystal element in the corresponding sub-array so the emitted light is primarily received only by those photosensors of the plurality of photosensors that cover the corresponding sub-array.

5. The PET detector module of claim 4,
    wherein each sub-array is covered by respective portions of a corresponding group of four photosensors of the plurality of photosensors;
    light from any individual scintillation crystal located in a corresponding sub-array is concentrated so as to be primarily received only by the respective portions of the corresponding group of four photosensors; and
    at least two photosensors of the plurality of photosensors, which receives light emitted from crystals in the first sub-array, also receives light emitted from crystals in one and only one sub-array that is adjacent to the first sub-array.

6. A radiation detector, comprising:
    a plurality of adjacent modular detector segments, each segment including
        an array of scintillation crystal elements;
        a light guide arranged adjacent to the array of scintillation crystal elements; and
        reflectors arranged around a periphery of the segment so that light produced by a scintillation event in the segment is substantially confined to the segment; and
    a plurality of photosensors arranged to cover the plurality of adjacent modular detector segments, wherein each photosensor of the plurality of photosensors is arranged to cover a portion of at most two of the segments.

7. The radiation detector of claim 6, wherein the detector consists of five modular detector segments including
    a first segment including an end-type array of scintillation crystal elements and an end-type light guide;
    a second segment including a middle-type array of scintillation crystal elements and a first middle-type light guide;
    a third segment including the middle-type array of scintillation crystal elements and a second middle-type light guide;
    a fourth segment including the middle-type array of scintillation crystal elements and the first middle-type light guide; and
    a fifth segment including the end-type array of scintillation crystal elements and the end-type light guide.

8. The radiation detector of claim 6, wherein the detector includes exactly nine modular detector segments.

9. The radiation detector of claim 6, wherein the detector includes an odd number of middle modular detector segments and two end modular detector segments.

10. A positron emission tomography (PET) scanner system, comprising:
    a plurality of detector modules arranged adjacent to one another to form a cylindrical detector ring, wherein each of the detector modules includes
        a plurality of adjacent modular detector segments, each segment including
            an array of scintillation crystal elements;
            a light guide arranged adjacent to the array of scintillation crystal elements; and
            reflectors arranged around a periphery of the segment so that light produced by a scintillation event in the segment is substantially confined to the segment; and
        a plurality of photosensors arranged to cover the plurality of adjacent modular detector segments, wherein each photosensor of the plurality of photosensors is arranged to cover a portion of at most two of the segments.

11. A method of using a positron emission tomography (PET) detector module that includes an array of scintillation crystal elements, the array including a plurality of substantially optically isolated sub-arrays, and a plurality of photosensors arranged to cover the array of crystal elements and configured to receive light emitted from the array of crystal elements, wherein the detector module is one of a plurality of detector modules forming a cylindrical detector ring, the method comprising:
    detecting a first scintillation event from a first sub-array of the plurality of sub-arrays within the detector module;

detecting a second scintillation event from a second sub-array of the plurality of sub-arrays within the detector module, wherein the first and second sub-arrays are separated by at least one sub-array within the detector module; and analyzing first signals from each photosensor involved in the first scintillation event, and simultaneously, analyzing second signals from each photosensor involved in the second scintillation event when the first and second sub-arrays are separated by at least one sub-array within the detector module.

12. The method of claim 11, wherein the analyzing step comprises:

determining a first position, a first energy, and a first arrival time for the first scintillation event; and determining a second position, a second energy, and a second arrival time for the second scintillation event.

13. The PET scanner system of claim 10, wherein the plurality of detector modules are independent and are arranged closer to one another than the width of one of the photosensors so as to form the cylindrical detector ring.

14. The PET scanner system of claim 10, wherein the plurality of detector modules are independent and are arranged less than four mm between one another so as to form the cylindrical detector ring.

15. A method of manufacturing a radiation detector module, comprising:

manufacturing a plurality of scintillation crystal sub-arrays, including two end sub-arrays and a plurality of middle sub-arrays;

manufacturing a plurality of light guide pieces, including two end pieces and a plurality of middle pieces, wherein the step of manufacturing the plurality of light guide pieces includes forming, in each light guide piece, at least one recessed portion for holding a respective photosensor;

attaching each end sub array to a corresponding one of the end pieces to form two end segments;

attaching each middle sub-array to a corresponding one of the middle pieces to form a plurality of middle segments;

attaching reflective material to a side surface of at least one of the middle segments; and attaching the end segments and the plurality of middle segments together to form a module base having a scintillation layer and a light guide layer, the formed light guide layer having a plurality of recessed portions so that when each photosensor of the plurality of photosensors is arranged in a corresponding recessed portion of the plurality of recessed portions, each photosensor covers a portion of at most two of the sub-arrays.

16. The method of claim 15, further comprising arranging a plurality of photosensors on the module base.

17. The method of claim 15, wherein the step of manufacturing the plurality of light guide pieces comprises forming, in each light guide piece, at least two recessed portions for holding respective photosensors of different sizes; and the method further comprises arranging a plurality of photosensors on the module base, the plurality of photosensors including photosensors of different sizes.

18. The method of claim 15, wherein the step of manufacturing the plurality of light guide pieces, including the plurality of middle pieces, comprises:

manufacturing at least one middle piece of a first type and at least one middle piece of a second type.

19. A radiation detector, comprising:

a plurality of adjacent modular detector segments, each segment including an array of scintillation crystal elements;

a light guide arranged adjacent to the array of scintillation crystal elements; and reflectors arranged around a periphery of the segment so that light produced by a scintillation event in the segment is substantially confined to the segment, wherein each segment is coupled to a plurality of photosensors, each photosensor being configured to receive light from at least one of the segments; and wherein the detector consists of five modular detector segments including a first segment including an end-type array of scintillation crystal elements and an end-type light guide;

a second segment including a middle-type array of scintillation crystal elements and a first middle-type light guide;

a third segment including the middle-type array of scintillation crystal elements and a second middle-type light guide;

a fourth segment including the middle-type array of scintillation crystal elements and the first middle-type light guide; and a fifth segment including the end-type array of scintillation crystal elements and the end-type light guide.

* * * * *